United States Patent
Taki

(10) Patent No.: US 9,592,709 B2
(45) Date of Patent: Mar. 14, 2017

(54) TIRE-PRESSURE MONITOR SYSTEM

(71) Applicant: TOYOTA JIDOSHA KABUSHIKI KAISHA, Toyota-shi, Aichi (JP)

(72) Inventor: Yuji Taki, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/046,734

(22) Filed: Feb. 18, 2016

(65) Prior Publication Data

US 2016/0236522 A1   Aug. 18, 2016

(30) Foreign Application Priority Data

Feb. 18, 2015   (JP) ................................. 2015-029156

(51) Int. Cl.
*B60C 23/04* (2006.01)
*G07C 5/08* (2006.01)

(52) U.S. Cl.
CPC .............. *B60C 23/04* (2013.01); *G07C 5/085* (2013.01); *G07C 5/0825* (2013.01)

(58) Field of Classification Search
CPC combination set(s) only.
See application file for complete search history.

(56) References Cited

U.S. PATENT DOCUMENTS

| 2006/0058977 A1* | 3/2006 | Zhu ........................ B60C 23/061 702/148 |
| 2010/0066522 A1 | 3/2010 | Ichikawa et al. |
| 2015/0077238 A1* | 3/2015 | Kitagawa ............ B60C 23/0415 340/447 |

FOREIGN PATENT DOCUMENTS

| JP | 2006-021716 A | 1/2006 |
| JP | 2007-112314 A | 5/2007 |
| JP | 2013-023127 A | 2/2013 |

* cited by examiner

*Primary Examiner* — Kabir A Timory
(74) *Attorney, Agent, or Firm* — Oliff PLC

(57) ABSTRACT

[Objective] Unreceived malfunction should be prevented from being reported, at the time of a set replacement of tires. [Means for Solution] About each registered sensor ID, the unreceived malfunction judging portion 56 outputs a malfunction signal to the notification controller 53, when an unreceived period exceeds first setup time Tref1. The total unreceived period calculation portion 57 outputs a self-vehicle ID discrimination initiation instruction to ID discrimination/rewriting portion, when the sum total unreceived period Ttotal which is the sum total of the unreceived period of each registered sensor ID is calculated and the sum total unreceived period Ttotal exceeds second setup time Tref2. Before an unreceived period exceeds first setup time Tref1, registered sensor ID is rewritten and it can avoid reporting unreceived malfunction to a driver by this.

2 Claims, 10 Drawing Sheets

TIRE-PRESSURE MONITOR SYSTEM

TECHNICAL FIELD

The present invention relates to a tire-pressure monitor system which comprises wheel sensors fixed to the respective of wheels and a vehicle body side device fixed to a vehicle body and performs a notification processing according to a tire pressure with the vehicle body side device by transmitting tire-pressure information representing a tire pressure from each wheel sensor to the vehicle body side device as a radio signal.

BACKGROUND ART

Conventionally, a tire-pressure monitor system (Tire Pressure Monitoring System: TPMS) which informs a driver of tire-pressure information has been known. The tire-pressure monitor system comprises a tire-pressure sensor unit (referred to as a wheel sensor) which detects a tire pressure for each wheel, and is configured to transmit tire-pressure information as a radio signal from this wheel sensor and receive this radio signal by a vehicle body side device to acquire the tire-pressure information. When judged that the tire pressure has been decreased based on the received tire-pressure information, the vehicle body side device displays that on an annunciator to notify it to a driver.

The vehicle body side device receives not only the radio signal transmitted from the wheel sensor disposed in the wheel of the vehicle (self-vehicle), but also the radio signal transmitted from the wheel sensor disposed in many and unspecified vehicles. For this reason, in order to distinguish from which wheel sensor the radio signal that the vehicle body side device receives is transmitted; the radio signal contains a sensor ID which is discrimination information unique to a wheel sensor, in addition to the tire-pressure information.

The sensor ID of the wheel sensor disposed in the wheel of the vehicle is beforehand registered into a non-volatile memory of the vehicle body side device. Therefore, the vehicle body side device is configured to refer to the sensor ID memorized in the non-volatile memory and acquire the tire-pressure information included in the radio signal specified by this sensor ID as the tire-pressure information of the wheel of the vehicle (self-vehicle).

In the Patent Document 1 (PTL1), a device which registers a sensor ID of a wheel sensor disposed in a wheel of the vehicle (self-vehicle) according to a wheel location is proposed. In this device, a user gives an impact to tires of right-and-left front-and-rear wheels of a vehicle in an order described in documented work instructions. The wheel sensor disposed in each wheel contains an acceleration sensor, and transmits own sensor ID to the vehicle body side device when this acceleration sensor detects the impact acts on the tire. Therefore, the sensor ID transmitted from each wheel sensor is transmitted to the vehicle body side device in the order in which the user gave an impact to the tire, i.e., the order described in the documented work instructions. Based on this order in which the sensor IDs are received, the vehicle body side device acquires the correspondence relation between the sensors ID and wheel locations, and memorizes the correspondence relation into the non-volatile memory. Therefore, in this device, rewriting of the sensor IDs is performed by a users manual operation.

Moreover, a technology for distinguishing a sensor ID of the wheel sensor of a self-vehicle out of sensor IDs of the radio signals transmitted from many and unspecified wheel sensors and automatically registering the same has been also known. For instance, in the Patent Document 2 (PTL2), a device which memorizes all the sensor IDs of radio signals received until a predetermined time has passed since a radio signal transmitted from a wheel sensor for the first time (this period is referred to as an entry period) and thereafter searches for the sensor ID of the wheel sensor of the vehicle among the memorized sensor IDs is proposed. In this device, a sensor ID presumed to be assigned to a wheel sensor of a vehicle other than the vehicle (self-vehicle) is eliminated from the sensor ID memorized as registration candidates during the entry period. Then, when the number of remaining sensor IDs becomes equal to the number of the wheels of the self-vehicle, the sensor IDs are registered as the sensor IDs of the wheel sensors of the self-vehicle.

CITATION LIST

Patent Literature

[PTL1] Japanese Patent Application Laid-Open "kokai" No. 2013-23127

[PTL2] Japanese Patent Application Laid-Open "kokai" No. 2006-21716

SUMMARY OF INVENTION

Generally, in a tire-pressure monitor system, when an ignition switch is turned on, an operation of a vehicle body side device will begin. The vehicle body side device reads a sensor ID (referred to as a registered sensor ID) memorized in a non-volatile memory, and when a radio signal containing this registered sensor ID is received, it acquires a tire-pressure information from that radio signal. For this reason, when a wheel sensor is replaced with another one, it is necessary to rewrite the registered sensor ID memorized in the non-volatile memory to the sensor ID of the replaced wheel sensor. Generally, the replacement between a summer tire and a winter tire is performed as the whole wheel. In this case, since a wheel sensor is also replaced together, it becomes necessary to rewrite the sensor ID. Hereafter, "a tire replacement" means a tire replacement including a wheel.

In the device proposed in the Patent Document 1 (PTL1), a user's operation is needed in order to rewrite a sensor ID, and it is user-unfriendly. Especially, since the rewriting operation of a sensor ID is done only at the time of a tire replacement, a user may not understand how to carry out it and will rely on a vehicle dealer after all. Moreover, the user may forget that the rewriting operation of a sensor ID must be done.

In a tire-pressure monitor system, a rule that a user must be informed of a system malfunction when a situation where tire-pressure information cannot be reported in a certain period of time (for instance, within 10 minutes, or within 20 minutes, etc.) is defined. For this reason, the vehicle body side device judges whether a status that a radio signal cannot be received beyond a certain period of time (referred to as an unreceived status) has continued, for every registered sensor ID, and turns on a warning lamp when the unreceived status is detected.

By illumination of such a warning lamp, the device proposed in the Patent Document 1 (PTL1) can also prompt a rewriting operation of a sensor ID by a user. However, the troublesomeness of an operation has not yet been solved.

A system which has a function to automatically register a sensor ID, like the device proposed in the Patent Document 2 (PTL2), starts searching a sensor ID of a self-vehicle at the same time as the illumination of a warning lamp when an unreceived status is detected. Therefore, since the searching of a sensor ID of the self-vehicle is started only after the stage of informing a user of a malfunction, it will take a long time for the sensor ID of the self-vehicle to be registered finally. Moreover, since the illumination of the warning lamp is continued until the sensor ID is registered, the driver will feel troublesomeness.

The present invention has been conceived in order to cope with the above-mentioned issue, and its objective is in preventing troublesomeness from being felt by the driver as much as possible.

In order to attain the above-mentioned objective, the feature of the present invention is in that:

a tire-pressure monitor system comprising:

wheel sensors (10), each of which comprises a pneumatic sensor (11) to detect a tire pressure and a transmitter (16) to repeatedly transmit wheel information that is information including tire-pressure information representing the tire pressure detected by said pneumatic sensor and a unique sensor ID, as a radio signal, and is fixed to and disposed in each of wheels of a vehicle, and a vehicle body side device (50, 100) which comprises a receiver (51) to receive the wheel information which said wheel sensors transmit respectively, an ID registration portion (54) to register therein the sensor IDs of the wheel sensors used as targets for an air pressure monitor, and a reporting portion (53, 100) to report to a driver of said vehicle the tire-pressure information transmitted from the wheel sensor specified by the sensor ID registered in said ID registration portion, and is fixed to and disposed in a vehicle body, wherein:

said vehicle body side device comprises:

a time measuring means (55) to measure an unreceived period that is a continuous time period in which the wheel information specified by said sensor ID is not received under a situation where the wheel information specified by said sensor ID should be transmitted, for every sensor IDs registered in said ID registration portion, a malfunction reporting means (56, 53) to report a malfunction to said driver of said vehicle when said unreceived period exceeds a first set time (Tref1) for any of the sensor IDs registered in said ID registration portion, a total time calculating means (57) to calculate total unreceived period (Ttotal) which is a sum total of the unreceived period for a specific number larger than 1 of said sensor IDs, a rewriting means (58) to start a discrimination processing for distinguishing the sensor IDs of said wheel sensors respectively disposed in the wheels of the self-vehicle among many and unspecified sensor IDs received by said receiver when said total unreceived period exceeds a second set time (Tref2) which is shorter than a time period obtained by multiplying said specific number by said first set time, and to rewrite the sensor ID registered in said ID registration portion to the sensor ID distinguished by said discrimination processing.

In this case, it is preferable that:

said total time calculating means is configured to calculate a total unreceived period which is a sum total of the unreceived period for said sensor IDs of the right-and-left front-and-rear wheels of the vehicle, and said second setup time is set to a time period which is shorter than 4 times as much as said first setup time.

The tire-pressure monitor system according to the present invention comprises wheel sensors fixed to and disposed in the wheels respectively and a vehicle body side device fixed to and disposed in the vehicle body. Each wheel sensor comprises a pneumatic sensor which detects a tire pressure and a transmitter which repeatedly transmits wheel information that is information including tire-pressure information representing the tire pressure detected by the pneumatic sensor and a unique sensor ID as a radio signal.

The vehicle body side device comprises a receiver which receives the wheel information that the wheel sensors transmit respectively, an ID registration portion in which the sensor IDs of the wheel sensors used as targets for an air pressure monitor are registered, and a reporting portion which reports to a driver the tire-pressure information transmitted from the wheel sensor specified by the sensor ID registered in the ID registration portion.

When a wheel sensor is exchanged by tire replacement etc., the sensor IDs registered in the ID registration portion becomes different from the sensor IDs of the wheel sensors actually disposed in the wheels of the self-vehicle. For this reason, the vehicle body side device becomes unable to detect the tire pressure of the self-vehicle. Generally, in a tire-pressure monitor system, when a situation where it is impossible to detect the tire pressure of a self-vehicle continues for a certain time period or more, it is necessary to inform a driver of a malfunction, for every wheel. In order to cope with it, the vehicle body side device comprises a time measuring means and a malfunction reporting means.

The time measuring means measures an unreceived period that is a continuous time period in which the wheel information specified by the sensor ID is not received under a situation where the wheel information specified by the sensor ID should be transmitted, for every sensor IDs registered in the ID registration portion. The "situation where the wheel information specified by the sensor ID should be transmitted" means a situation where the wheel information is normally transmitted from the wheel sensor. For instance, when a system is configured so that the wheel information is transmitted from the wheel sensor only when the vehicle is running at a predetermined vehicle speed or higher, it means a situation where the vehicle is running at a predetermined vehicle speed or higher. Moreover, for example, when a system is configured so that the wheel information is transmitted from the wheel sensor unconditionally, it will be always the situation where the wheel information should be transmitted.

When the wheel sensors have been exchanged and, therefore, the sensor IDs registered in the ID registration portion are different from the sensor IDs of the wheel sensors disposed in the wheels of the self-vehicle, a status that the wheel information of the sensor IDs registered in the ID registration portion cannot be received continues. In such a case, the unreceived period measured by the time measuring means goes on increasing.

The malfunction reporting means reports a malfunction to the driver of the vehicle when the unreceived period exceeds a first set time for any of the sensor IDs. A means to report a malfunction may be a means to visually appeal to the driver, such as lighting or blink of a warning lamp, or may be a means to appeal to the auditory sense of the driver, such as sound of a warning buzzer or a phonetic announce, for example.

The situation where the sensor IDs are improperly registered due to the replacement of the wheel sensors is different from a situation where a failure has generated in the system. Therefore, when the vehicle body side device detects that the wheel sensors have been exchanged in an early stage and the sensor ID registered in the ID registration portion is rewritten, the malfunction reporting means can be prevented from reporting a malfunction.

For instance, usually in a tire replacement, a set of four wheels are replaced (for instance, exchanged between summer tires and winter tires). Since a tire is exchanged together with a wheel, all the wheel sensors attached to the wheels will also be exchanged. For this reason, once a tire-pressure monitor system starts up, for all sensor IDs of the right-and-left front-and-rear wheels registered in the ID registration portion, each unreceived period goes on increasing. Therefore, when the unreceived periods of a plurality of sensor IDs registered in the ID registration portion go on increasing, it can be presumed that the wheel sensors have been replaced due to a tire replacement. Especially, the more the number of sensor IDs whose unreceived periods goes on increasing together is, the more reliable such a presumption becomes.

In the present invention, it is presumed that the wheel sensors have been exchanged based on the increase in the unreceived periods of the sensor IDs of a plurality of the wheel sensors, and the discrimination processing for distinguishing the sensor IDs of the wheel sensors disposed in the wheels of the self-vehicle is started based on the presumption. In order to do so, the vehicle body side device comprises a total time calculating means and a rewriting means.

The total time calculating means calculates total unreceived period that is a sum total of the unreceived period for a specific number, which is larger than 1, of the sensor IDs (a specific number of the sensor IDs included in the sensor IDs registered in the ID registration portion). In this case, it is preferable to calculate the total unreceived period for the sensor IDs of four wheels (right-and-left front-and-rear wheels) disposed in the vehicle.

The rewriting means starts a discrimination processing for distinguishing the sensor IDs of the wheel sensors respectively disposed in the wheels of the self-vehicle among many and unspecified sensor IDs received by the receiver when the total unreceived period exceeds a second set time which is shorter than a time period obtained by multiplying the specific number by the first set time, and rewrites the sensor ID registered in the ID registration portion to the sensor ID distinguished by the discrimination processing. Therefore, when a status that the wheel information cannot be received synchronously for a plurality of the sensor ID registered in the ID registration portion continues, the discrimination processing can be started in an early stage.

For this reason, before the unreceived period for each sensor ID reaches the first set time, it becomes possible to complete the discrimination processing, and it is becomes unnecessary for the malfunction reporting means to report a malfunction. In this case, what is necessary is just to determine the second set time in consideration of the time period required for the discrimination processing. For instance, the second set time may be set to a time period shorter than a time period obtained by subtracting the time period required for the discrimination processing from the first set time and multiplying a time period obtained by the subtraction by the specific number.

As a result, in accordance with the present invention, it can be prevented from giving troublesomeness to a driver as much as possible. Moreover, in a case where a failure of each wheel sensor, poor reception in the vehicle body side device, etc. have occurred (i.e., when a malfunction which should be reported to a driver have occurred), the driver can be informed of a malfunction at a point of time when the unreceived period reaches the first set time. Therefore, reliability of the system can be maintained.

In addition, in the above-mentioned explanation, in order to help understanding of the invention, the reference signs used in an embodiment are attached in parenthesis to the configuration of the invention corresponding to the embodiment, but each constituent elements of the invention are not limited to the embodiment specified with the above-mentioned reference signs.

DESCRIPTION OF EMBODIMENTS

Figure 1:
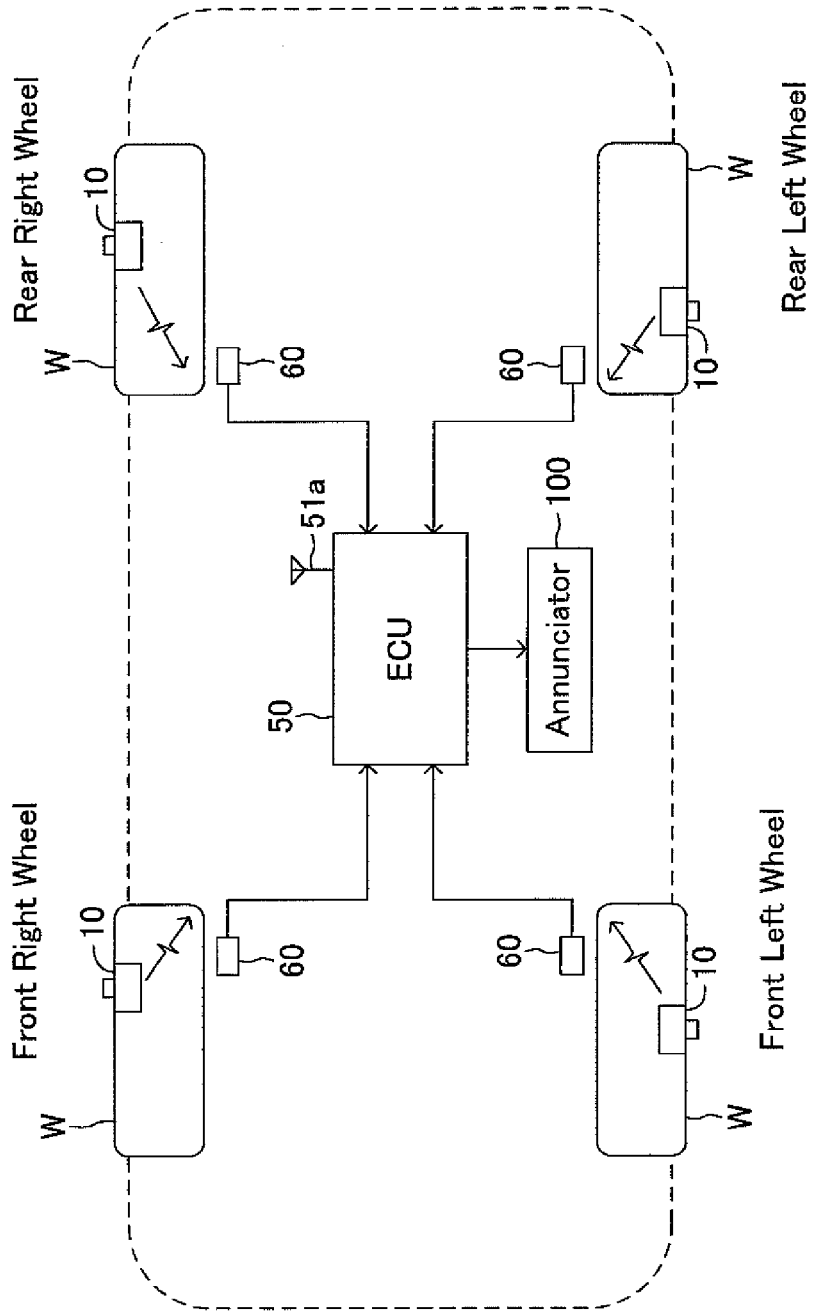
FIG. 1 is a schematic diagram of a tire-pressure monitor system according to an embodiment of the present invention.
Figure 2:
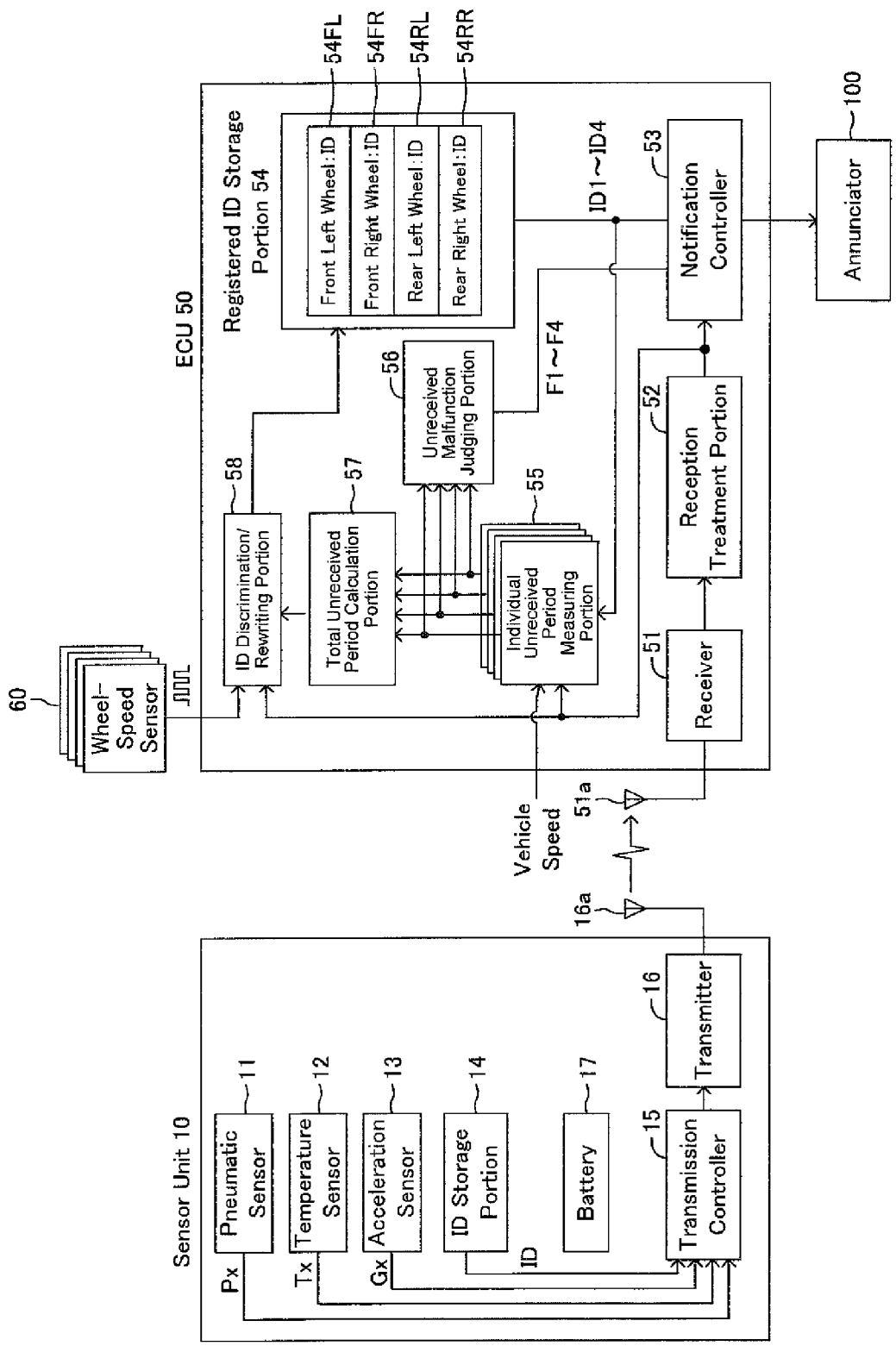
FIG. 2 is a functional block diagram in a sensor unit and an ECU.

Hereafter, a tire-pressure monitor system according to one embodiment of the present invention will be explained using drawings. FIG. 1 shows the schematic configuration of the tire-pressure monitor system for a vehicle. The tire-pressure monitor system is a system for reporting air pressure information of a tire to a driver, and comprises tire-pressure sensor units 10 (hereafter, referred to as sensor units 10) which is fixed to respective wheels W, a tire-pressure reporting control unit (hereafter, referred to as an ECU 50) fixed to a vehicle body and an annunciator 100. The sensor unit 10 corresponds to the wheel sensor of the present invention. Moreover, a configuration which consists of the ECU 50 and the annunciator 100 corresponds to the vehicle body side device of the present invention. FIG. 2 shows a functional block diagram in the sensor unit 10 and the ECU 50. Since all the sensor units 10 disposed in respective wheels W have the same function altogether, FIG. 2 shows one of them.

The sensor unit 10 is attached to the tire air injection valve prepared in a rim of the wheel W. The sensor unit 10 comprises a pneumatic sensor 11, a temperature sensor 12, an acceleration sensor 13, an ID storage portion 14, a transmission controller 15, a transmitter 16 and a battery 17, as shown in FIG. 2. These constituent elements 11 to 17 are contained and unitized in one casing.

The pneumatic sensor 11 detects the air pressure of a tire and outputs a detection signal which represents the air pressure Px to the transmission controller 15. The temperature sensor 12 detects the temperature of the tire and outputs a detection signal which represents the tire temperature Tx to the transmission controller 15. The acceleration sensor 13 detects the acceleration in a direction of centrifugal force of the wheel W and outputs a detection signal which represents the acceleration Gx to the transmission controller 15. The ID storage portion 14 is a non-volatile memory for memorizing the sensor IDs which are discrimination information of the sensor units 10, and outputs the sensors ID to the transmission controller 15.

The transmission controller 15 comprises a microcomputer as a principal part, generates transmission data containing the air pressure Px detected by the pneumatic sensor 11, the tire temperature Tx detected by the temperature sensor 12, the acceleration Gx detected by the acceleration sensor 13 and the sensor ID memorized in the ID storage portion 14, and outputs it to the transmitter 16.

When the transmission data outputted from the transmission controller 15 is inputted, the transmitter 16 will convert the transmission data into a radio signal, and will transmit it to the ECU 50 through a transmission antenna 16*a*. The transmitter 16 transmits the above-mentioned radio signal at the timing when the transmission data is inputted. Therefore, the timing when the transmitter 16 transmits the radio signal is controlled by the transmission controller 15.

This transmitter 16 is configured to be able to transmit only to the ECU 50 (bidirectional communication is impossible), and unilaterally transmits the above-mentioned radio signal. Hereafter, the information transmitted as a radio signal from the transmitter 16 (corresponding to the transmission data outputted from the transmission controller 15 to the transmitter 16) will be referred to as wheel information.

The battery 17 supplies electric power for operation to respective electrical loads in the sensor unit 10, and functions as a power supply.

The transmission controller 15 sets up the transmission timing of the radio signal based on the acceleration Gx detected by the acceleration sensor 13 and a transmission time interval. The acceleration sensor 13 used in the present embodiment detects the acceleration in a direction of centrifugal force of the wheel W (diameter direction). Since the acceleration sensor 13 rotates along with the wheel W to which the acceleration sensor 13 itself is attached, the acceleration Gx in a direction of centrifugal force is rippled by the influence of gravity in accordance with its own turning position (turning position of the sensor unit 10). This rippled component of the acceleration Gx in a direction of centrifugal force is a gravitational-acceleration component.

Figure 10:
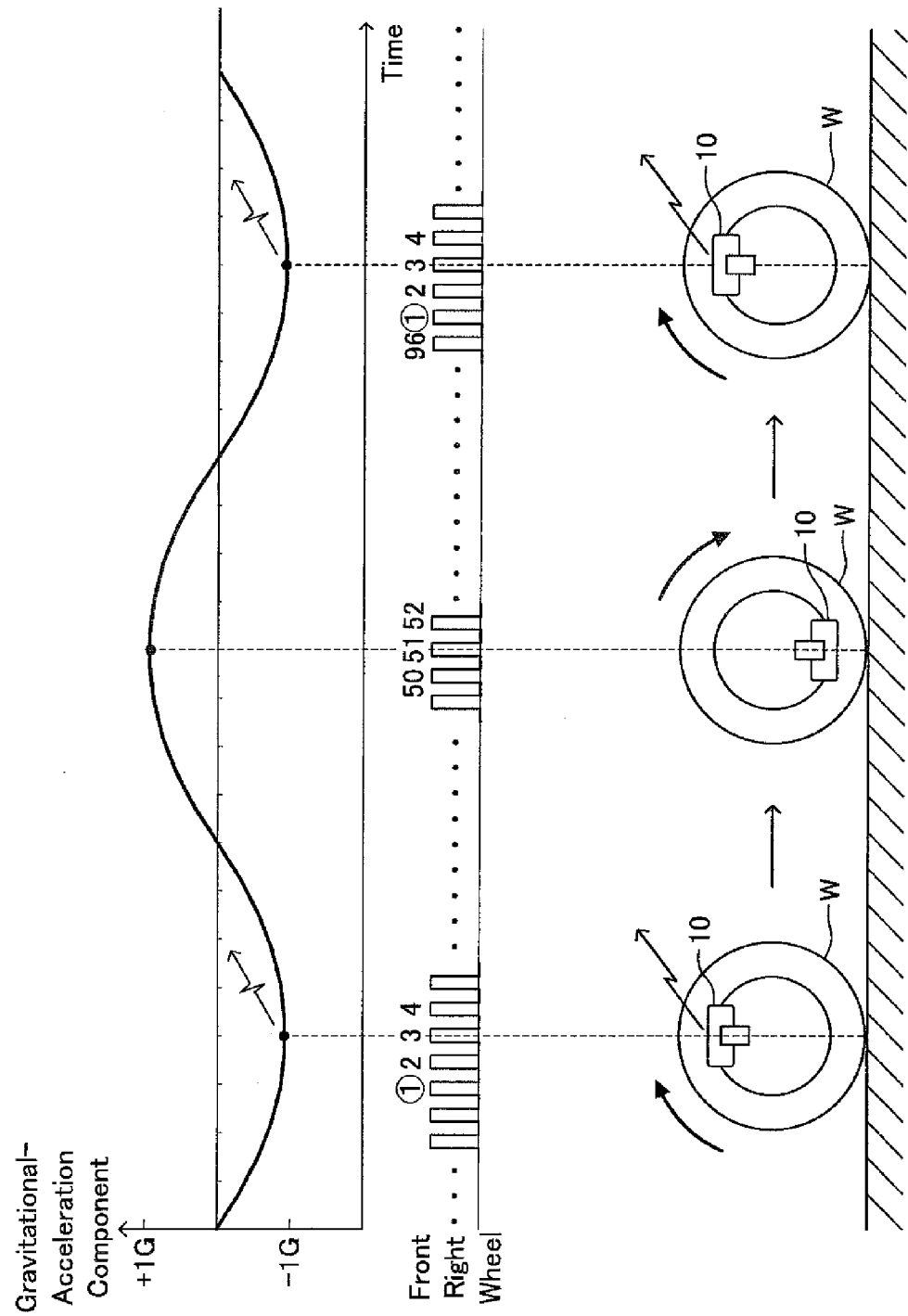
FIG. 10 is a drawing for showing as an image a relation among the turning position, transmission timing and pulse number of a sensor unit.

The gravitational-acceleration component changes sinusoidally in a range from −1G to +1 G, while the wheel W rotates one revolution, as shown in FIG. 10 (G represents the gravitational acceleration of the earth). For this reason, the turning position around the axle shaft of the sensor unit 10 can be detected from the value of the gravitational-acceleration component contained in the acceleration Gx detected by the acceleration sensor 13. In the present embodiment, the timing when the gravitational-acceleration component becomes −1G, i.e., the timing when the turning position of the sensor unit 10 comes to the uppermost point, is set up as the transmission timing of the radio signal.

Since the transmission interval while the vehicle is running becomes short if the transmission timing of the radio signal is set up simply based on the turning position of the sensor unit 10, a transmission time interval condition is added so that a transmission time interval of a predetermined time period (in the present embodiment, 1 minute) is secured. That is, a timing when the turning position of the sensor unit 10 comes to a setting location (in this example, the uppermost point) for the first time after a predetermined time has passed since the radio signal was transmitted last time is set as the transmission timing of the radio signal.

Moreover, the transmission controller 15 transmits the radio signal at the above-mentioned transmission timing, when the vehicle speed is a fixed speed (for instance, 20 km/h) or higher. The transmission controller 15 estimates the vehicle speed based on the acceleration Gx detected by the acceleration sensor 13. For instance, the vehicle speed can be estimated based on the ripple period (pulsation period) of the gravitational-acceleration component contained in the acceleration Gx. Moreover, the higher the vehicle speed becomes, the more the centrifugal force which acts on the acceleration sensor 13 increases. Therefore, the vehicle speed can also be estimated from a value obtained by subtracting the gravitational-acceleration component from the acceleration Gx.

In addition, although the radio signal is transmitted only when the vehicle speed is a fixed speed or more in the present embodiment, it is not necessary to necessarily do so and it may be configured to transmit the radio signal also when the vehicle speed is less than the fixed speed. Since the sensor unit 10 does not circle during the vehicle is stopping, the transmission timing cannot be set up based on the turning position of the sensor unit. Therefore, the transmission timing in the case where the vehicle speed becomes less than the fixed speed only has to be set in a fixed time period, for example.

Next, the ECU 50 will be explained. The ECU 50 comprises a microcomputer and a communication circuit as a principal part, and comprises a receiver 51, a reception processing portion 52, a notification controller 53, a registered ID storage portion 54, an individual unreceived period measuring portion 55, an unreceived malfunction judging portion 56, a total unreceived period calculation portion 57, and an ID discrimination/rewriting portion 58, from a functional perspective. Moreover, the ECU 50 is connected with the annunciator 100 disposed near a driver's seat. The ECU 50 starts its operation when an ignition switch is turned on, and it stops its operation when the ignition switch is turned off.

The receiver 51 receives the radio signal (wheel information) transmitted from each sensor unit 10 through a reception antenna 51*a*. This receiver 51 receives the radio signals transmitted from the sensor units 10 fixed to the wheels W of not only the self-vehicle, but also many and unspecified other vehicles. The reception processing portion 52 extracts data representing the sensor ID, the air pressure Px, the tire temperature Tx and the acceleration Gx from the radio signal, whenever the receiver 51 receives the radio signal. The reception processing portion 52 outputs these data to the notification controller 53, the individual unreceived period measuring portion 55 and the ID discrimination/rewriting portion 58.

The notification controller 53 creates annunciation data which represents the air pressures Px of four wheels of the vehicle with respect to each wheel location, based on the data inputted from the reception processing portion 52 (the sensor ID, the air pressure Px and tire temperature Tx) and the sensor IDs of the four wheels memorized in the registered ID storage portion 54.

The registered ID storage portion 54 is a non-volatile memory which memorizes the sensor IDs of the sensor units 10 attached to the wheels W of the self-vehicle in association with their wheel locations. The registered ID storage portion 54 comprises a front left wheel ID storage area 54FL for memorizing the sensor ID assigned to the sensor unit 10 of a front left wheel, a front right wheel ID storage area 54FR for memorizing the sensor ID assigned to the sensor unit 10 of a front right wheel, a rear left wheel ID storage area 54RL for memorizing the sensor ID assigned to the sensor unit 10 of a rear left wheel, and a rear right wheel ID storage area 54RR for memorizing the sensor ID assigned to the sensor unit 10 of a rear right wheel.

Hereafter, the sensor IDs memorized in the registered ID storage portion 54 will be referred to as registered sensor IDs. Especially, when it is necessary to distinguish the registered sensor IDs according to each storage area, the sensor ID memorized in the front left wheel ID storage area 54FL is referred to as a registered sensor ID1, the sensor ID memorized in the front right wheel ID storage area 54FR is referred to as a registered sensor 102, the sensor ID memorized in the rear left wheel ID storage area 54RL is referred to as a registered sensor 103, and the sensor ID memorized in the rear right wheel ID storage area 54RR is referred to as a registered sensor ID4.

The notification controller 53 refers to a correspondence relation between the registered sensor IDs and the wheel locations memorized in the registered ID storage portion 54, creates the annunciation data which represents the air pressures Px of the four wheels according to their wheel locations based on the data inputted from the reception processing portion 52, and outputs the created annunciation data to the annunciator 100. Moreover, the notification controller 53 compares the air pressure Px with a proper evaluation value Pref for every wheels, and outputs insufficient air pressure wheel location data which identifies the wheel location where the air pressure is insufficient to the annunciator 100 when the air pressure Px is less than the proper evaluation value Pref.

In addition, the notification controller 53 also judges whether the tire temperature Tx has become an unusually elevated temperature based on the inputted tire temperature Tx, and outputs tire overheat information to another vehicle controller which is not shown when an overheat status of a tire is detected. Moreover, the notification controller 53 may be configured to output overheated tire location data which specifies the wheel location of the overheated tire to the annunciator 100. Moreover, the notification controller 53 may be configured to correct the proper evaluation value Pref for judging the propriety of a tire pressure based on the tire temperature Tx.

The annunciator 100 comprises a display disposed in a location which can be sighted from a driver's seat, a display driver which drives the display, and a display microcomputer which controls the display driver, and displays a tire-pressure monitoring screen image on the display according to the annunciation data outputted from the notification controller 53, for example.

Figure 3:
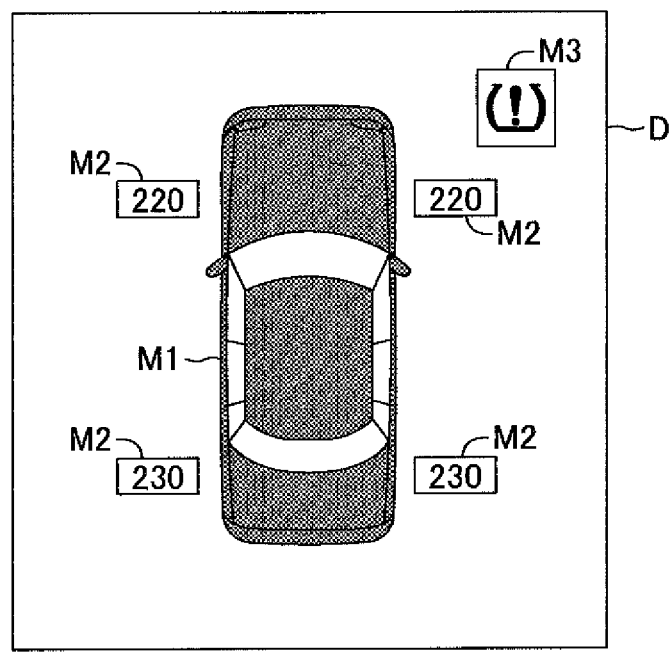
FIG. 3 is a drawing for showing a display screen image (normal time) which an annunciator displays.

FIG. 3 represents a tire-pressure monitoring screen image D displayed on the display of the annunciator 100. A vehicle body mark M1 representing a top-view pattern of a vehicle body, air pressure value display portions M2 which are disposed corresponding to respective wheel locations and display numerical values of the tire pressures, and a warning mark M3 for calling a driver's attention are displayed on the tire-pressure monitoring screen image D.

Figure 4:
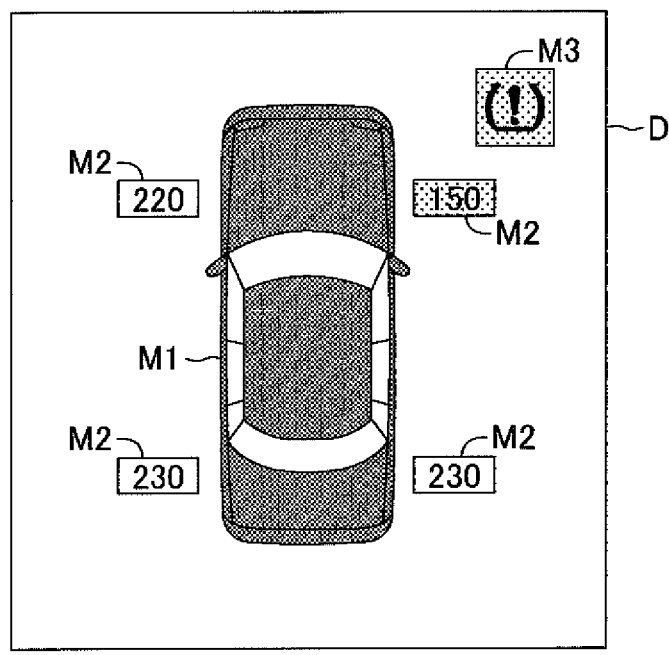
FIG. 4 is a drawing for showing a display screen image (tire-pressure malfunction time) which an annunciator displays.

The annunciator 100 displays the numerical values of the air pressures on the air pressure value display portions M2 based on the annunciation data inputted from the notification controller 53. Moreover, in the case where it is judged that the shortage of air pressure has occurred based on the insufficient air pressure wheel location data, it changes the display mode of the air pressure value display portion M2 of the wheel in which air pressure shortage occurs (for instance, its background color and character color may be changed) and turns on the warning mark M3, as shown in FIG. 4. FIG. 4 shows an example in which a tire pressure shortage occurs in the front right wheel. The warning mark M3 is configured to be able to be sighted by a driver only when it is turned on, and to be unable to be sighted by a driver when it is turned off. Therefore, a driver can recognize which wheel W lacks for air pressure, along with its air pressure value.

Figure 5:
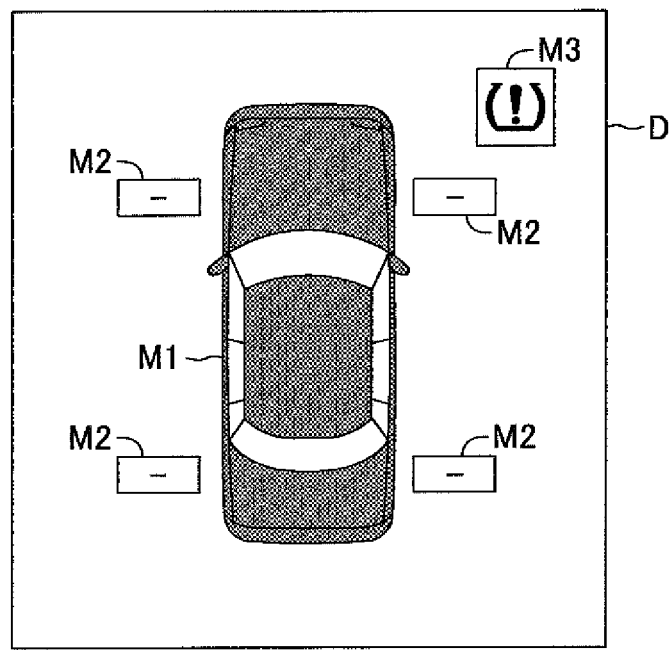
FIG. 5 is a drawing for showing a display screen image (start-up time) which an annunciator displays.

Since the ECU 50 starts up by an ignition switch being turned ON, it does not acquire the tire-pressure information from the sensor unit 10 immediately after its start-up. In this case, as shown in FIG. 5, the notification controller 53 displays the mark of "-" etc. on the air pressure value display portions M2 of tire-pressure monitoring screen D, and reports that it is in the status that the tire pressure has not been detected yet. At this time, the notification controller 53 does not turn the warning mark M3 on.

Figure 6:
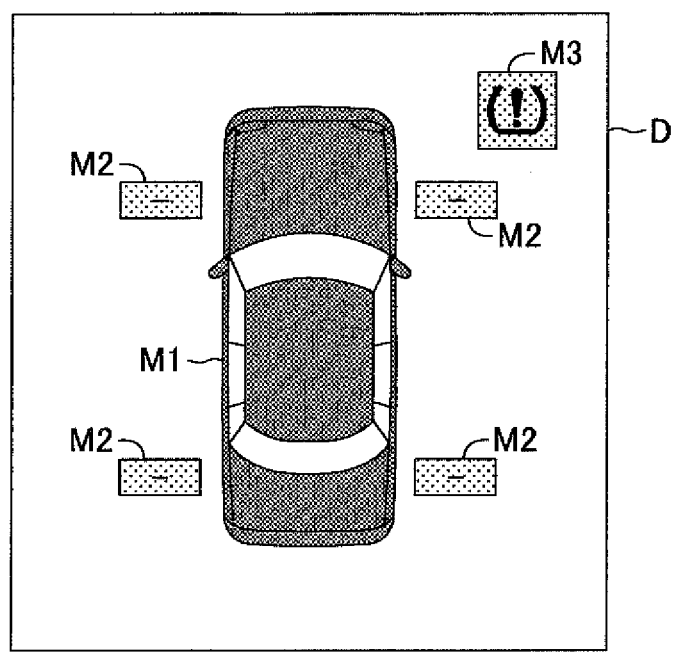
FIG. 6 is a drawing for showing a display screen image (unreceived malfunction time) which an annunciator displays.

Moreover, when the unreceived malfunction-detection signal outputted from the unreceived malfunction judging portion 56 which will be mentioned later is inputted, the notification controller 53 changes the display mode of the "-" mark displayed on the air pressure value display portion M2 (for instance, the background color and character color are changed) for the wheel W specified by the unreceived malfunction-detection signal (unreceived malfunction judging flag which will be mentioned later), and turns on the warning mark M3. FIG. 6 shows an example in which an unreceived malfunction is detected in all four wheels (right-and-left front-and-rear wheels).

The individual unreceived period measuring portion 55 is a functional portion which measures an unreceived period that is a continuous time period in which the wheel information is not received, for every registered sensor ID. Since it is configured so that the sensor unit 10 may transmit the wheel information while the vehicle is running at a fixed vehicle speed or more in the system of the present embodiment, the individual unreceived period measuring portion 55 measures an unreceived period when the vehicle is running with a vehicle speed not less than a set vehicle speed Vref (may be equivalent to the vehicle speed set as a condition for the sensor unit 10 to transmit the wheel information).

In addition, when the sensor unit 10 is configured to transmit the radio signal in a fixed period regardless of the vehicle speed, the individual unreceived period measuring portion 55 just has to measure, as the unreceived period, the continuous time period in which the wheel information cannot be received regardless of the vehicle speed. That is, the individual unreceived period measuring portion 55 measures the continuous time period in which the wheel information including the sensor ID registered in the registered sensor ID cannot be received, under a situation where the wheel information should be transmitted the sensor unit 10 normally.

Figure 7:
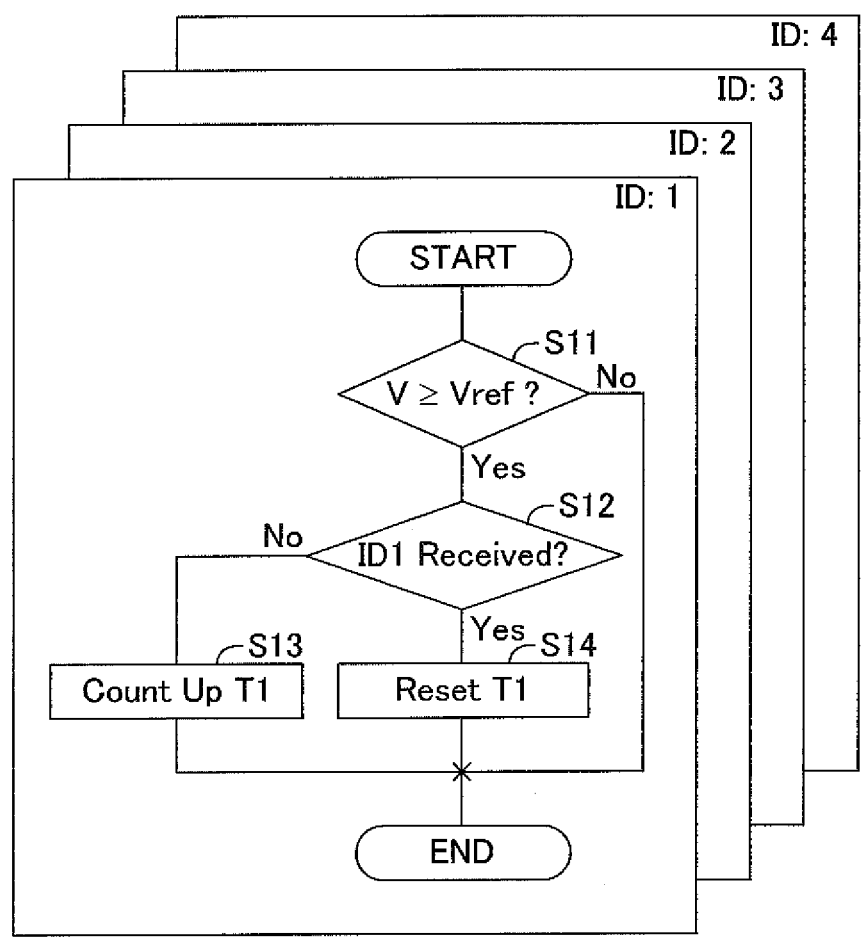
FIG. 7 is a flowchart for showing an unreceived period measuring routine.

FIG. 7 shows an unreceived period measuring routine which the individual unreceived period measuring portion 55 carries out. The unreceived period measure routine is carried out in parallel respectively for the four registered sensors ID1 to ID4 memorized (registered) in the registered ID storage portion 54. Although the unreceived period measuring routine for the registered sensor ID1 will be explained here, the same applies to other registered sensors ID2 to ID4. The unreceived period measuring routine is repeated in a predetermined short operation period.

In step S11, the individual unreceived period measuring portion 55 reads the vehicle speed detected by a vehicle speed sensor which is not shown, and judges whether the vehicle speed V is not less than a set vehicle speed Vref. This set vehicle speed Vref is set to a vehicle speed at which the wheel information should be transmitted from the sensor unit 10, for instance, 20 km/h. Since the sensor unit 10 will not transmit the wheel information when the vehicle speed V is less than the set vehicle speed Vref, the individual unreceived period measuring portion 55 once ends this routine.

When the vehicle is running at the set vehicle speed Vref or higher, the individual unreceived period measuring portion 55 judges, in step S12, whether the wheel information including the registered sensor ID1 memorized in the front left wheel ID storage area 54FL of the registered ID storage portion 54 has been received. The reception processing portion 52 outputs the sensor ID to the individual unreceived period measuring portion 55, whenever the receiver 51 receives the wheel information. The individual unreceived period measuring portion 55 judges, in this step S12, whether the sensor ID identical to the registered sensor ID1 is outputted from the reception processing portion 52. In this case, the individual unreceived period measuring portion 55 reads the registered sensor ID1 memorized in the front left wheel ID storage area 54FL, and judges whether the sensor ID outputted from the reception processing portion 52 is identical to the registered sensor ID1.

In step S12, the individual unreceived period measuring portion 55 judges it as "No", when the sensor ID is not outputted from the reception processing portion 52, or when the sensor ID outputted from the reception processing portion 52 differs from the registered sensor ID1. In this case, the individual unreceived period measuring portion 55 counts up a measurement time T1 of an unreceived timer of the registered sensor ID1 in step S13. This measurement time T1 represents the continuous time period in which the wheel information including the registered sensor ID1 is not received. The initial value of the measurement time T1 is set to zero. The processing in step S13 is a processing to increase the measurement time T1 by a time period corresponding to the operation period in which the unreceived period measuring routine is repeated.

The individual unreceived period measuring portion 55 repeats such a processing in a predetermined operation period. And, when the sensor ID identical to the registered sensor ID1 is outputted from the reception processing portion 52 (S12: Yes), the individual unreceived period measuring portion 55 will reset the measurement time T1 in step S14. That is, when the wheel information specified by the registered sensor ID1 is received from the sensor unit 10, the measurement time T1 is reset (cleared to zero).

By repeating such a processing, the individual unreceived period measuring portion 55 calculates the measurement time T1 that is the continuous time period in which the wheel information including the registered sensor ID1 is not received. The individual unreceived period measuring portion 55 carries out the same processing for other registered sensor IDs, i.e., ID2 to ID4. Hereafter, when specifying individually the unreceived periods regarding the registered sensor ID1, ID2, ID3 and ID4, ID4, they will be referred to as the unreceived periods T1, T2, T3 and T4.

Each sensor unit 10 transmits the wheel information as a radio signal for every about one minute. This wheel information cannot be necessarily received by the ECU 50 at every transmission, due to a reduction of the reception intensity when the ECU 50 receives the radio signal (situation where the reception intensity of the transmitted radio signal is below a reception limit), an influence of a noise, a failure of the sensor unit 10, etc. Therefore, when the wheel information including the registered sensor ID cannot be received by the ECU 50, the unreceived period increases.

In the tire-pressure monitor system according to the present embodiment, a rule that a driver must be informed of a system malfunction when a situation where the tire-pressure information cannot be reported in a certain period of time (for instance, within 10 minutes) during the vehicle is running (at a vehicle speed at which the sensor unit 10 is defined to transmit the wheel information) is defined. The continuous time period in which the tire-pressure information cannot be received is denoted by the unreceived period measured by the individual unreceived period measuring portion 55.

Figure 8:
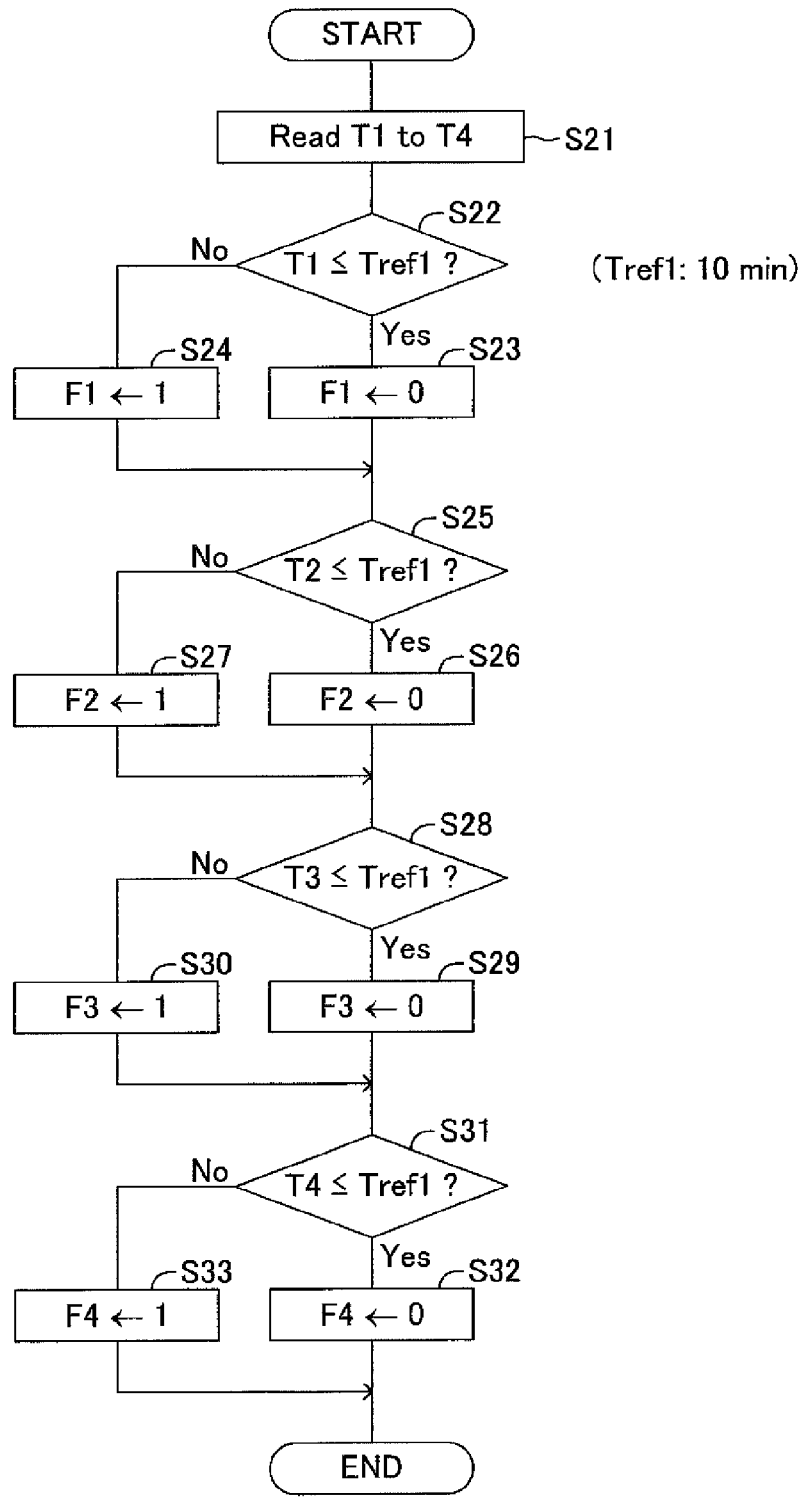
FIG. 8 is a flowchart for showing an unreceived malfunction judging routine.

Based on this unreceived period, the unreceived malfunction judging portion 56 judges a system malfunction, and outputs the unreceived malfunction judging flag which is a signal representing the judgment result to the notification controller 53. FIG. 8 shows an unreceived malfunction judging routine which the unreceived malfunction judging portion 56 carries out. The unreceived malfunction judging portion 56 repeats the unreceived malfunction judging routine in a predetermined operation period. While the unreceived malfunction judging routine is being carried out, the above-mentioned unreceived period measuring routine is carried out by the individual unreceived period measuring portion 55.

When the unreceived malfunction judging routine starts, the unreceived malfunction judging portion 56 reads the unreceived period T1, T2, T3 and T4 currently measured by the individual unreceived period measuring portion 55, in step S21. Then, in step S22, it is judged whether the unreceived period T1 regarding the registered sensor ID1 is not more than the first set time Tref. The first set time Tref1 is set up to 10 minutes in the present embodiment.

When the unreceived period T1 is the first set time Tref or less, the unreceived malfunction judging portion 56 sets the unreceived malfunction judging flag F1 to "0" in step S23. On the other hand, when the unreceived period T1 is over the first set time Tref1 (this status is referred to as an unreceived status), the unreceived malfunction judging flag F1 is set to "1" since it is a status that a driver must be informed of a system malfunction.

The unreceived malfunction judging portion 56 judges similarly whether the unreceived periods T2 to T4 are not more than the first set time Tref1 for the registration sensor IDs, i.e., ID2 to ID4 (S25, S28, S31). An unreceived malfunction judging flag F2 representing the unreceived status of the registered sensor ID2 is set to "0" when the unreceived period T2 is not more than the first set time Tref1, and it is set to "1" when the T2 exceeds the first set time Tref1 (S26, S27). An unreceived malfunction judging flag F3 representing the unreceived status of the registered sensor ID3 is set to "0" when the unreceived period T3 is not more than the first set time Tref1, and it is set to "1" when the T3 exceeds the first set time Tref1, (S29, S30). An unreceived malfunction judging flag F4 representing the unreceived status of the registered sensor ID4 is set to "0" when the unreceived period T4 is not more than the first set time Tref1, and it is set as "1" when the T4 exceeds the first setup time Tref1, (S32, S33).

The unreceived malfunction judging portion 56 outputs the unreceived malfunction judging flags F1, F2, F3 and F4 to the notification controller 53. The notification controller 53 turns on the warning mark M3 of the annunciator 100 when at least one of the unreceived malfunction judging flags F1, F2, F3, and F4 has been set to "1." Moreover, while the air pressure value display portion M2 of the wheel location set to "1" is changed to "-", and its display mode is changed (for instance, its background color and character color are changed). Thereby, the driver can know the occurrence of a system malfunction.

When the sensor unit 10 is exchanged, it becomes impossible to receive the radio signal containing the registered sensor ID of the removed sensor unit 10 (sensor ID memorized in the registered ID storage portion 54 at the time of the replacement). For this reason, the unreceived malfunction flag F is set to "1" for the registered sensor ID of the wheel location where the sensor unit 10 has been exchanged (replaced), and a system malfunction is reported to a driver by the annunciator 100.

The situation where the registration of a sensor ID is improper due to replacement of the sensor unit 10 is different from the situation where a failure has occurred in the system. As will be mentioned later, the tire-pressure monitor system according to the present embodiment comprises a function to automatically distinguish the sensor ID of the sensor unit 10 of the self-vehicle and memorize that in the registered ID storage portion 54. Therefore, if it can be estimated in an early stage that the sensor unit 10 has been exchanged, it becomes unnecessary to report a system malfunction by starting the automatic discrimination of the sensor ID of the sensor unit 10 of the self-vehicle at that time and registering the correct sensor ID in the registered ID storage portion 54 within the first set time (10 minutes).

Usually in a tire replacement, a set of four wheels are replaced. Since a tire is exchanged together with a wheel, all the sensor units 10 attached to the wheels will also be exchanged. For this reason, once the ECU 50 starts up, for all the registered sensor IDs of the right-and-left front-and-rear wheels registered in the registered ID storage portion 54, their respective unreceived periods (T1 to T4) go on increasing. Therefore, when the unreceived periods (T1 to T4) of the four registered sensor IDs registered in the registered ID storage portion 54 go on increasing all together, it can be presumed that the sensor units 10 have been replaced due to the tire replacement.

Figure 9:
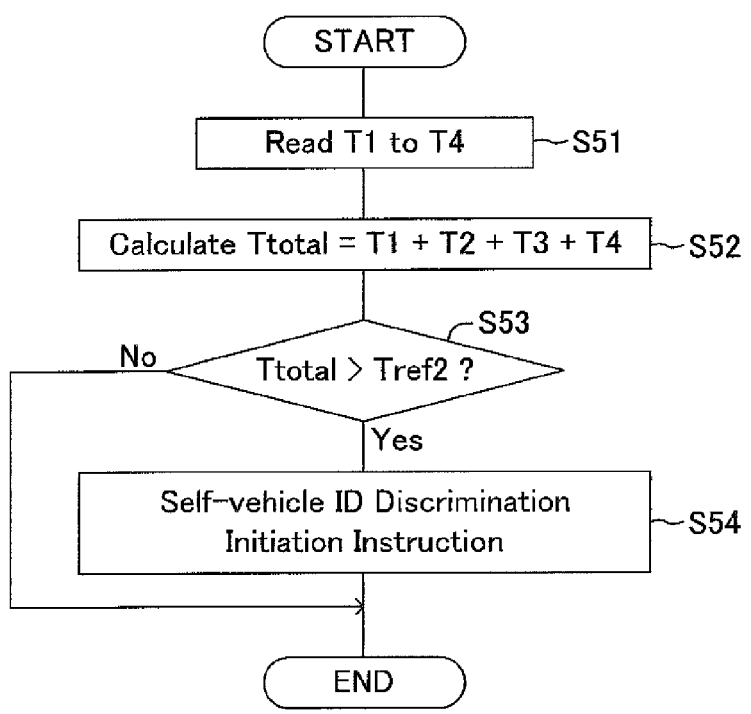
FIG. 9 is a flowchart for showing a tire replacement presuming routine.

The total unreceived period calculation portion 57 is prepared as a functional portion which performs this presumption. FIG. 9 is a flowchart showing a tire replacement presuming routine which the total unreceived period calculation portion 57 carries out. The total unreceived period calculation portion 57 repeats the tire replacement presuming routine in a predetermined operation period. While the tire replacement presuming routine is being carried out, the above-mentioned unreceived period measuring routine is being carried out by the individual unreceived period measuring portion 55.

Once the tire replacement presuming routine starts up, the total unreceived period calculation portion 57 reads the unreceived periods T1, T2, T3 and T4 currently measured by the individual unreceived period measuring portion 55, in step S51. Then, the total unreceived period calculation portion 57 calculates the total unreceived period Ttotal (=T1+T2+T3+T4) which is a sum total value of the unreceived periods T1, T2, 13 and T4, in step S52.

Then, the total unreceived period calculation portion 57 judges whether the total unreceived period Ttotal exceeds a predetermined second set time Tref2, in step S53. The second set time Tref2 is set to 10 minutes in the present embodiment.

When the vehicle runs at a speed of the set vehicle speed Vref or higher after the four sensor units 10 are exchanged by replacement of four tires at the same time, all the unreceived periods T1, T2, T3 and T4 go on increasing (not reset). For this reason, the total unreceived period Ttotal increases by 4 times of each of the increment speeds of the unreceived periods T1, T2, T3 and T4. Therefore, when the total unreceived period Ttotal reach the second set time Tref2 (10 minutes), it is a stage where the unreceived status has continued only for 2.5 minutes (=10 minutes/4) in fact. That is, the actual time period in which the unreceived status continues synchronously for the four registered sensor IDs is a time period obtained by dividing the total unreceived period Ttotal by the number of the sensor units 10 (number of the registered sensor IDs).

When it is judged that the total unreceived period Ttotal does not exceed the predetermined second set time Tref2 in step S53, the total unreceived period calculation portion 57 once ends the tire replacement presuming routine. The total unreceived period calculation portion 57 repeats the tire replacement presuming routine in a predetermined operation period. And, when the total unreceived period Ttotal exceeds the second set time Tref2 (10 minutes) (S53: Yes), the total unreceived period calculation portion 57 outputs a self-vehicle ID discrimination initiation instruction to the ID discrimination/rewriting portion 58 in step S54, and end the tire replacement presuming routine.

For instance, when the ECU 50 starts up (the tire-pressure monitor system starts up) first in a status that the four sensor units 10 were exchanged by replacement of four tires and if the integrated time when the vehicle runs at a speed of the set vehicle speed Vref or higher exceeds 2.5 minutes, the self-vehicle ID discrimination initiation instruction will be outputted from the total unreceived period calculation portion 57. Therefore, 7.5 minutes are remaining before the unreceived malfunction judging portion 56 sets the unreceived malfunction judging flags F1, F2, F3 and F4 to "1" at this point of time. When the sensor IDs of the actually mounted sensor units 10 are registered in the registered ID storage portion 54 within this remaining time (7.5 minutes), it is not necessary to turn on warning mark M3 in the annunciator 100. That is, it is not necessary to perform warning unnecessary for a driver.

When the self-vehicle ID discrimination initiation instruction outputted from the total unreceived period calculation portion 57 is inputted, the ID discrimination/rewriting portion 58 will carry out a self-vehicle ID discrimination processing, a wheel location discrimination processing and an ID rewriting processing. The self-vehicle ID discrimination processing is a processing to specify the sensor ID of the sensor unit 10 disposed in the wheel W of the self-vehicle among many and unspecified sensor IDs contained in the received reception signal. The wheel location discrimination processing is a processing to distinguish to which wheel W the sensor unit 10 corresponding to the sensor ID specified by the self-vehicle ID discrimination processing is attached. The ID rewriting processing is a processing to memorize the sensor IDs whose wheel locations are pinpointed by the wheel location discrimination processing in the predetermined areas (54FL, 54FR, 54RL, 54RR) of the registered ID storage portion 54. In addition, the self-vehicle ID discrimination processing can also be done in the wheel location discrimination processing.

The reception processing portion 52 outputs the sensor ID contained in the radio signal to the ID discrimination/rewriting portion 58 at every reception of the radio signal.

The ID discrimination/rewriting portion 58 narrows down the sensor ID of the sensor unit 10 of the self-vehicle from the sensor IDs outputted from the reception processing portion 52 (self-vehicle ID discrimination processing).

The self-vehicle ID discrimination processing can be performed as follows. For instance, the ID discrimination/rewriting portion 58 samples a plurality of the sensor IDs outputted from the reception processing portion 52 for every sensor ID for a fixed period, and judges that the sensor ID with a large sampling number (contained in the radio signal with a large number of times of reception) is the sensor ID of the sensor unit 10 of the self-vehicle. Alternatively, the self-vehicle ID discrimination processing can also be performed based on the reception intensity of the radio signal. For instance, the reception processing portion 52 outputs data representing the reception intensity of the radio signal in association with the sensor ID to the ID discrimination/rewriting portion 58. The ID discrimination/rewriting portion 58 samples a plurality of the reception intensities of the radio signals outputted from the reception processing portion 52 for a fixed period, and judges that the sensor ID contained in the radio signal with a large reception intensity is the sensor ID of the sensor unit 10 of the self-vehicle among sampling data.

In such a self-vehicle ID discrimination processing, it is not necessary to necessarily narrow down the sensor IDs to four (wheel number). This is because four sensor ID can finally be specified by the wheel location discrimination processing, as will be mentioned later.

The ID discrimination/rewriting portion 58 narrows down the candidates of the sensor IDs of the sensor units 10 of the self-vehicle by the self-vehicle ID discrimination processing and thereafter carries out the wheel location discrimination processing next. In carrying out wheel location discrimination processing, the ID discrimination/rewriting portion 58 uses a pulse signal which the wheel-speed sensor 60 outputs.

The ID discrimination/rewriting portion 58 is connected to the wheel-speed sensors 60 disposed in the four wheels, and a number proportional to the wheel speed of each wheel W of pulse signals are inputted from the wheel-speed sensor 60 thereto. The ID discrimination/rewriting portion 58 specifies the sensor IDs of the sensor units 10 in the four wheel locations based on a relation between a count value of the pulse signal which the wheel-speed sensors 60 output and the timing of reception of the radio signal (timing when the ID discrimination/rewriting portion 58 is inputted the sensor ID from the reception processing portion 52).

The wheel-speed sensor 60 is disposed respectively corresponding to each wheel W, and outputs a predetermined number of pulse signals while the wheel W rotates one revolution. The wheel-speed sensor 60 in the present embodiment outputs the pulse signal 96 times while the wheel W rotates one revolution. That is, the pulse signal is outputted whenever the wheel W rotates a fixed angles (3.75 degrees (=360/96)).

The ID discrimination/rewriting portion 58 starts counting the pulse signal which the wheel-speed sensor 60 outputs at an arbitrary timing, and returns a pulse count value to "1" and resumes counting when the count value exceeds "96" which is the number of the pulse signals for one revolution of the wheel. The pulse count value which is thus converted into a value of "96" or less is referred to as a pulse number. For instance, when the pulse count value increases as 95, 96, 97, 98, 99 the pulse number will be set up so as to change as 95, 96, 1, 2, 3 . . . . The pulse number comes to a value representing the reminder resulted from a division of the pulse count value by the number of the pulse signals for one revolution of the wheel.

As mentioned above, the sensor unit 10 transmits the wheel information at a location where its own turning position is uppermost, that is, at a location where the gravitational-acceleration component detected by the acceleration sensor 13 becomes −1G. Therefore, when the sensor unit 10 and the wheel-speed sensor 60 are disposed in a common wheel W, the pulse number of each wheel W sampled on reception of the wheel information transmitted by the sensor unit 10 becomes constant fundamentally.

FIG. 10 is a drawing which shows a relation between the turning position of the sensor unit 10 and the pulse number in an arbitrary wheel W, as an image. This example shows that the pulse number of the forward right wheel is indicated as a constant value "3" when the turning position of the sensor unit 10 always comes to the uppermost location.

Respective wheels W do not necessarily rotate at the same speed as one another, and mutual rotational speeds become different due to an inner ring difference, an outer wheel difference and a slip, etc. For this reason, the sampled pulse number fluctuates, when the sensor unit 10 and the wheel-speed sensor 60 do not correspond to a common wheel W.

Using such a principle, the ID discrimination/rewriting portion 58 memorizes the pulse numbers of the respective wheel-speed sensors 60 at that time in association with the sensor IDs whenever the sensor ID as a candidate is inputted from the reception processing portion 52. That is, the pulse numbers are sampled. And, based on the pulse number of each wheel-speed sensor 60 sampled for every sensor IDs, the wheel W having the wheel-speed sensor 60 with the smallest variation in the pulse number is specified as the wheel W to which its own sensor unit 10 is attached. Thereby, the relation between the sensor IDs of the sensor units 10 attached to the wheels in the self-vehicle and the wheel locations is determined.

The ID discrimination/rewriting portion 58 memorizes the determined relation between the sensor IDs and the wheel locations in the registered ID storage portion 54. That is, the registered sensor IDs memorized in the ID storage areas 54FL, 54FR, 54RL and 54RR are rewritten to the sensor IDs specified by the wheel location discrimination processing.

When the registered sensor IDs memorized in the registered ID storage portion 54 are rewritten, the unreceived periods regarding the registered sensor IDs are reset (cleared to zero) at the timing when the wheel information including the rewritten sensor ID is transmitted thereafter. That is, in step S12 of the unreceived period measuring routine which the individual unreceived period measuring portion 55 carries out, the subjects for judging the existence of a reception of the radio signal are changed to the rewritten new registered sensor IDs. Thereby, the unreceived periods are reset (S14) at the timing when the rewritten sensor ID is inputted to the individual unreceived period measuring portion 55 from the reception processing portion 52 (S12:Yes). Therefore, the registered sensor IDs can be rewritten before the unreceived period reaches the first set time Tref1, and the warning mark M3 of the annunciator 100 can be prevented from being turned on.

In accordance with the tire-pressure monitor system according to the present embodiment as explained above, the total unreceived period calculation portion 57 sums up the unreceived periods regarding the four registered sensor IDs, and the ID discrimination/rewriting portion 58 starts the discrimination (search) of the sensor ID of the sensor unit 10 of the self-vehicle when the total unreceived period Ttotal reaches a second set time Tref2 (10 minutes). This second setup time Tref2 is set to a time period shorter than a time period obtained by multiplying the first setup time Tref1 used as a reference for reporting an unreceived malfunction by the number of the registered sensor IDs (Tref1×4).

For this reason, when the four sensor units 10 are exchanged like in the case of a replacement of a set of tires, the discrimination (search) of the sensor ID of the sensor unit 10 of the self-vehicle can be started before an unreceived malfunction is detected (in stage in which a 2.5-minute unreceived period has passed, in this example). Since the discrimination of sensor ID also including wheel location discrimination processing is completed within about 5 minutes, the registered sensor IDs can be rewritten before the unreceived period of each registered sensor ID reaches the first set time Tref1. As a result, since the warning mark M3 of the annunciator 100 is not turned on, it can avoid giving troublesomeness to a driver.

On the other hand, when a situation where the radio signal cannot be unreceived due to another factor, such as poor reception of the radio signal, a failure of the sensor unit 10 itself, etc. continues, the unreceived malfunction for every sensor units 10 (every sensor IDs) can be detected by the individual unreceived period measuring portion 55. For this reason, when a system malfunction which should be reported to a driver occurs, the warning mark M3 of the annunciator 100 can certainly be turned on to inform the driver that a malfunction has occurred. Therefore, the reliability of the system can be maintained.

Moreover, when the sensor units 10 are exchanged, a driver does not need to manually register new sensor IDs. For this reason, it is user-friendly.

Although the tire-pressure monitor system according to the present embodiment has been explained as mentioned above, the present invention is not limited to the above-mentioned embodiment, and various modifications are possible for the present invention unless they deviate from the objective of the present invention.

For instance, although the total unreceived periods Ttotal are calculated for the registered sensor IDs of the four wheels (right-and-left front-and-rear wheels) in the present embodiment, it may be configured so as to acquire the total unreceived period Ttotal obtained by summing up the unreceived periods of the registered sensor IDs of two wheels (two of the four wheels) or the total unreceived period Ttotal obtained by summing up the unreceived periods of the registered sensor IDs of three wheels (three of the four wheels). In that case, it is preferable that the second set time Tref2 is set to a time period shorter than a time period obtained by multiplying the number of the registered sensor IDs as the subjects whose unreceived periods are summed up (n=2 or 3) by the first set time Tref1 (2×Tref1 or 3×Tref1).

Moreover, in this case, it is preferable that the registered sensor IDs having a long unreceived period are selected as the subjects whose unreceived periods are summed up. For instance, it is preferable that two registered sensor IDs having the longest unreceived period are selected as the subjects whose unreceived periods are summed up and their unreceived periods are summed up when the number of the registered sensor IDs as the subjects is 2, and it is preferable that three registered sensor IDs having the longest unreceived period are selected as the subjects whose unreceived periods are summed up and their unreceived periods are summed up when the number of the registered sensor IDs as the subjects is 3.

Moreover, the first set time Tref1 and the second set time Tref2 can be set arbitrarily. In this case, the second set time Tref2 may be set based on an assumption time Tx which is a time period assumed to be required for starting the discrimination of the sensor IDs of the self-vehicle and memorizing them in the registered ID storage portion 54. For instance, when the number of the registered sensor IDs as the subject whose unreceived periods are summed up (corresponding to the specific number in the present invention) is defined as n, it is preferable that the second set time Tref2 is set to a time period shorter than (Tref1−Tx)×n.

Moreover, in the registration of the sensor IDs, a manual registration function may be further provided in addition to the automatic registration function. For instance, a manual switch (not shown) is disposed in an arbitrary location of the vehicle, and the signal of the manner switch is supplied to the ID discrimination/rewriting portion 58. The ID discrimination/rewriting portion 58 carries out the above-mentioned processing (the self-vehicle ID discrimination processing, the wheel location discrimination processing and the ID rewriting processing), not only when the self-vehicle ID discrimination initiation instruction outputted from the total unreceived period calculation portion 57 is inputted, but also when an operation signal is inputted from the manner switch. In accordance with this modification, even when one of the sensor units 10 is exchanged, the warning mark M3 can be prevented from being turned on by operating the manner switch immediately after a start-up of the tire-pressure monitor system.

Moreover, in the present embodiment, although the ID discrimination/rewriting portion 58 performs the self-vehicle ID discrimination processing and the wheel location discrimination processing separately, it may be configured so that the sensor IDs of the sensor units 10 of the self-vehicle can be distinguished only by the wheel location discrimination processing.

Moreover, various techniques can be employed also for the self-vehicle ID discrimination processing. For instance, the ID discrimination/rewriting portion 58 also acquires data representing the accelerations Gx in addition to and in association with the sensors ID from the reception processing portion 52, and narrows down the candidates of the sensor IDs of the self-vehicle based on these accelerations Gx and a motional state of the self-vehicle. In this case, the ID discrimination/rewriting portion 58 compares an average wheel rotation status detected by the wheel-speed sensor 60 when the sensor ID is inputted (when the radio signal containing the sensor ID is received by the receiver 51) with the wheel rotation status estimated from the acceleration Gx and, when they are greatly different from each other, it judges that the inputted sensor ID is not the sensor ID of the sensor unit 10 of the self-vehicle and is eliminates it from the candidates of the sensor IDs of the sensor units 10 of the self-vehicle. Moreover, also when a transition of the acceleration Gx in an arbitrary sensor ID (a transition of the acceleration Gx contained in the radio signal received multiple times) is different from a transition of the average wheel rotation status detected by the wheel-speed sensor 60, it eliminates the sensor ID from the candidates of the sensor IDs of the sensor units 10 of the self-vehicle. For instance, this correspond to a case where the acceleration Gx does not change or decreases between 2 times of reception even though the speed of wheel revolution of the self-vehicle is increasing.

Moreover, although it is configured so that a display screen reports tire-pressure information in the present embodiment, it may be configured not to use a display screen, that is, it may be configured so that a phonetic announce device is used for reporting tire-pressure information, for instance.

Moreover, although the pulse signal outputted by the wheel-speed sensor 60 is directly entered to the ECU 50 (ID discrimination/rewriting portion 58) in the present embodiment, it may be configured to retrieve information representing the output number of the pulse signals into the ECU 50 from a brake control device (not shown) which is inputted the pulse signals outputted by the wheel-speed sensor 60 and calculates a wheel speed, for instance. The brake control device counts the number of the pulse signals which the wheel-speed sensor 60 outputted in a predetermined time (for instance, 30 milliseconds), and outputs information (wheel-speed information) representing the count number in a predetermined time period. Therefore, the ECU 50 can accumulate the count number of the pulse signals which the brake control device outputs to detect the number of pulse signals.

Moreover, although it is configured to distinguish and register the sensor IDs of the self-vehicle according to wheel locations in the present embodiment, it is not necessarily register the sensor IDs according to wheel locations, it may be configured so that the sensor IDs of the self-vehicle can be specified (distinguished) and registered among many and unspecified sensor IDs which are received. That is, it may be a system which monitors tire pressures not in distinction to every wheel locations. In this case, the registered ID storage portion 54 may be configured to memorize only the number of the sensor units 10 collectively rather than memorizing the sensor IDs of the self-vehicle in distinction to the wheel locations. Moreover, the respective sensor IDs memorized in the registered ID storage portion 54 may be used in step S12 of the unreceived malfunction judging routine shown in FIG. 7.

Moreover, although the system according to the present embodiment is a system which monitors tire pressures of running wheels (right-and-left front-and-rear wheels), it may be configured so that a function to monitor the tire pressure of a spare wheel is added further.

REFERENCE SIGNS LIST

10: sensor unit, 11: pneumatic sensor, 12: temperature sensor, 13: acceleration sensor, 14: ID storage part, 15: transmission controller, 16: transmitter, 50: ECU, 51: receiver, 52: reception processing portion, 53: notification controller, 54: registered ID storage portion, 55: individual unreceived period measuring portion, 56: unreceived malfunction judging portion, 57: total unreceived period calculation portion, 58: ID discrimination/rewriting portion, 60: wheel-speed sensor, 100: annunciator, D: tire-pressure monitoring screen, F1, F2, F3, F4: unreceived malfunction judging flag, Gx: acceleration, Px: air pressure, M3: warning mark, Tref1: first set time, Tref2: second set time, Ttotal: total unreceived period, W: wheel

The invention claimed is:

1. A tire-pressure monitor system comprising:
wheel sensors, each of which comprises a pneumatic sensor to detect a tire pressure and a transmitter to repeatedly transmit wheel information that is information including tire-pressure information representing the tire pressure detected by said pneumatic sensor and a unique sensor ID, as a radio signal, and is fixed to and disposed in each of wheels of a vehicle, and
a vehicle body side device which comprises a receiver to receive the wheel information which said wheel sensors transmit respectively, an ID registration portion to register therein the unique sensor ID of each of the wheel sensors used as targets for an air pressure monitor, and a reporting portion to report to a driver of said vehicle the tire-pressure information transmitted from a wheel sensor specified by the unique sensor ID registered in said ID registration portion, and is fixed to and disposed in a vehicle body, wherein:
said vehicle body side device comprises:
a time measuring means to measure an unreceived period that is a continuous time period in which the wheel information specified by said unique sensor ID is not received under a situation where the wheel information specified by said unique sensor ID should be transmitted, for every unique sensor ID registered in said ID registration portion,
a malfunction reporting means to report a malfunction to said driver of said vehicle when said unreceived period exceeds a first set time for any of the unique sensor IDs registered in said ID registration portion,
a total time calculating means to calculate total unreceived period which is a sum total of the unreceived period for a specific number larger than 1 of said unique sensor IDs,
a rewriting means to start a discrimination processing for distinguishing the unique sensor IDs of said wheel sensors respectively disposed in the wheels of the self-vehicle among many and unspecified sensor IDs received by said receiver when said total unreceived period exceeds a second set time which is shorter than a time period obtained by multiplying said specific number by said first set time, and to rewrite the unique sensor ID registered in said ID registration portion to the unique sensor ID distinguished by said discrimination processing.

2. The tire-pressure monitor system according to claim 1, wherein:
said total time calculating means is configured to calculate a total unreceived period which is a sum total of the unreceived period for said sensor IDs of the right-and-left front-and-rear wheels of the vehicle, and
said second setup time is set to a time period which is shorter than 4 times as much as said first setup time.

* * * * *